United States Patent
Le et al.

(10) Patent No.: US 10,510,078 B2
(45) Date of Patent: Dec. 17, 2019

(54) ANOMALY DETECTION IN GROUPS OF TRANSACTIONS

(71) Applicant: Vesta Corporation, Portland, OR (US)

(72) Inventors: Jianning Le, Lake Oswego, OR (US); John Lei, Portland, OR (US); Jiaqi Yu, Sherwood, OR (US); Charles Firkins, Newberg, OR (US); Robert Marssdorf, Portland, OR (US)

(73) Assignee: VESTA CORPORATION, Portland, OR (US)

( * ) Notice: Subject to any disclaimer, the term of this patent is extended or adjusted under 35 U.S.C. 154(b) by 441 days.

(21) Appl. No.: 14/951,087

(22) Filed: Nov. 24, 2015

(65) Prior Publication Data

US 2017/0148025 A1    May 25, 2017

(51) Int. Cl.
G06Q 40/00    (2012.01)
G06Q 20/40    (2012.01)

(52) U.S. Cl.
CPC ....... G06Q 20/4016 (2013.01); G06Q 20/401 (2013.01)

(58) Field of Classification Search
CPC .................................................... G06Q 20/40
USPC ................................................... 705/35–40
See application file for complete search history.

(56) References Cited

U.S. PATENT DOCUMENTS

| 7,428,509 B2 * | 9/2008 | Klebanoff | G06Q 20/10 705/35 |
| 7,793,835 B1 | 9/2010 | Coggeshall et al. | |
| 8,600,881 B2 * | 12/2013 | Nguyen | G06Q 20/20 235/1 R |

(Continued)

FOREIGN PATENT DOCUMENTS

| EP | 2790146 | 10/2014 | |
| GB | 2512070 A * | 9/2014 | ............ G06Q 20/02 |

(Continued)

OTHER PUBLICATIONS

Negahban: "Does Device Matter? Understanding How User, Device, and Usage Characteristics Influence Risky IT Behaviors of Individuals", University of North Texas, Aug. 2015 (Year: 2015).*

(Continued)

Primary Examiner — Edward J Baird
(74) Attorney, Agent, or Firm — Beyer Law Group LLP

(57) ABSTRACT

A payment processing system continuously processes transactions. A group of transactions satisfying criteria within a recent measurement window are extracted from transaction data. A second group of transactions satisfying the criteria within a past baseline window are also extracted. An attribute of transactions is selected for analysis and a risk metric value is calculated for transactions in the measurement window having a particular attribute value. The same risk metric is used to calculate a baseline value for transactions in the baseline window having the same attribute value. The baseline value may be normalized and adjusted. The risk metric value is compared to the baseline value and an alert is generated if the risk metric value is greater. Any of a variety of risk metrics are used. Total dollar amount and total order count from the measurement window compared to similar from the baseline window are also used to inform the alert.

12 Claims, 10 Drawing Sheets

Measurement and Baseline Time Windows of Transactions

(56) References Cited

U.S. PATENT DOCUMENTS

| | | | |
|---|---|---|---|
| 8,919,641 B2 * | 12/2014 | Bishop | G06Q 20/10 235/379 |
| 9,740,991 B2 * | 8/2017 | Seidman | G06Q 10/0639 |
| 9,892,465 B2 | 2/2018 | Love et al. | |
| 9,947,020 B2 * | 4/2018 | Fordyce, III | G06Q 20/10 |
| 9,996,825 B1 * | 6/2018 | Casey | G06Q 20/102 |
| 10,127,554 B2 * | 11/2018 | Russell | G06Q 20/40 |
| 2003/0006277 A1 | 1/2003 | Maskatiya | |
| 2007/0106582 A1 | 5/2007 | Baker | |
| 2008/0015978 A1 | 1/2008 | Curry | |
| 2008/0027860 A1 | 1/2008 | Mullen | |
| 2008/0275748 A1 | 11/2008 | John | |
| 2010/0057622 A1 | 3/2010 | Faith | |
| 2010/0280880 A1 | 11/2010 | Faith | |
| 2011/0131122 A1 * | 6/2011 | Griffin | G06Q 40/00 705/35 |
| 2011/0173116 A1 | 7/2011 | Yan | |
| 2011/0225158 A1 | 9/2011 | Snyder | |
| 2011/0238510 A1 | 9/2011 | Rowen | |
| 2011/0238575 A1 | 9/2011 | Nightengale et al. | |
| 2011/0307381 A1 * | 12/2011 | Kim | G06Q 20/027 705/44 |
| 2011/0307382 A1 * | 12/2011 | Siegel | G06Q 20/04 705/44 |
| 2012/0030083 A1 | 2/2012 | Newman | |
| 2012/0036073 A1 | 2/2012 | Basu | |
| 2012/0226613 A1 | 9/2012 | Adjaoute | |
| 2014/0156568 A1 | 6/2014 | Ganguly | |
| 2014/0230033 A1 * | 8/2014 | Duncan | G06F 21/32 726/7 |
| 2014/0244503 A1 | 8/2014 | Sadlier | |
| 2014/0258118 A1 | 9/2014 | Scott | |
| 2014/0258162 A1 | 9/2014 | Maran | |
| 2014/0279494 A1 | 9/2014 | Wiesman | |
| 2014/0351129 A1 | 11/2014 | Finot et al. | |
| 2015/0026062 A1 | 1/2015 | Paulsen | |
| 2015/0066739 A1 | 3/2015 | Lucas, Jr. | |
| 2015/0066797 A1 | 3/2015 | Outwater | |
| 2015/0095247 A1 | 4/2015 | Duan | |
| 2015/0170147 A1 | 6/2015 | Geckle | |
| 2015/0339673 A1 | 11/2015 | Adjaoute | |
| 2016/0005029 A1 | 1/2016 | Ivey | |
| 2016/0057248 A1 | 2/2016 | Tankha | |
| 2016/0171498 A1 * | 6/2016 | Wang | G06Q 20/4016 705/44 |
| 2016/0283942 A1 * | 9/2016 | Chitragar | G06Q 20/4016 |
| 2017/0116674 A1 * | 4/2017 | Howe | G06Q 40/08 |
| 2017/0132866 A1 | 5/2017 | Kuklinski | |
| 2017/0148024 A1 | 5/2017 | Yu et al. | |
| 2017/0148026 A1 | 5/2017 | Lei et al. | |

FOREIGN PATENT DOCUMENTS

| | | | | |
|---|---|---|---|---|
| GB | 2532512 A | * | 5/2016 | G07F 19/206 |
| WO | WO-2009082369 A1 | * | 7/2009 | G06Q 20/20 |

OTHER PUBLICATIONS

International Search Report dated Jan. 24, 2017 from International Application No. PCT/US2016/062545.

Written Opinion dated Jan. 24, 2017 from International Application No. PCT/US2016/06S545.

Final Office Action for U.S. Appl. No. 14/951,119, dated Aug. 21, 2019.

Final Office Action for U.S. Appl. No. 14/951,060, dated Aug. 6, 2019.

* cited by examiner

Anomaly Detection

| Screen Resolution Attribute Value | Order Number | Payment Device | Created Date | Order Date | $ Amount or Order | Age |
|---|---|---|---|---|---|---|
| 112 x 112 | 1 | 1114 | 7-26-14 | 7-27-14 | $300 | 1 |
| 112 x 112 | 2 | 2783 | 7-27-14 | 7-28-14 | $500 | 1 |
| 112 x 112 | 3 | 1049 | 7-19-14 | 7-29-14 | $50 | 10 |
| 112 x 112 | 4 | 0762 | 7-5-14 | 7-30-14 | $75 | 25 |
| 112 x 112 | 5 | 1982 | 7-1-14 | 7-31-14 | $8 | 30 |
| 100 x 100 | | | | | | |
| ... | | | | | | |
| 256 x 256 | | | | | | |
| ... | | | | | | |

*FIG. 6*

| CreateDTM | Partner | ChannelCd | Attribute Name | Attribute Value | Proportion NewPd7dMw | Proportion NewPd7dLimit | amtCmptMw | amtCmptLimit | numCmptMw | numCmptLimit |
|---|---|---|---|---|---|---|---|---|---|---|
| 7/24/2015 | 5 | 5 | BIN | 480011 | 0.130 | 0.08 | 1349.26 | 183.21 | 3506 | 18 |
| 7/24/2015 | 5 | 8 | PD_ZIP | 88008 | 0.570 | 0.22 | 1085.48 | 637.7 | 3797 | 459 |
| 7/24/2015 | 5 | 48 | E-mail Name | Neil.Young | 0.760 | 0.66 | 4079.52 | 683.46 | 729 | 84 |
| 7/24/2015 | 5 | 5 | BIN | 517800 | 0.840 | 0.75 | 3775.13 | 1273.79 | 2810 | 80 |
| 7/24/2015 | 5 | 48 | PD_ZIP | 97132 | 0.570 | 0.53 | 4208.44 | 3279.83 | 4902 | 4305 |
| 7/24/2015 | 5 | 6 | E-mail Name | hot2trot | 0.620 | 0.49 | 1269.98 | 264.79 | 1315 | 35 |
| 7/24/2015 | 5 | 5 | BIN | 443175 | 0.080 | 0.05 | 1943.78 | 751.81 | 199 | 1 |
| 7/24/2015 | 5 | 9 | PD_ZIP | 55416 | 0.520 | 0.18 | 810.73 | 313.02 | 2593 | 505 |
| 7/24/2015 | 5 | 5 | E-mail Name | johnDoe99 | 0.170 | 0.15 | 4676.25 | 4374.28 | 2754 | 529 |
| 7/24/2015 | 5 | 8 | BIN | 443161 | 0.220 | 0.22 | 4693.89 | 2191.03 | 568 | 499 |

Alert Table

*FIG. 9*

ANOMALY DETECTION IN GROUPS OF TRANSACTIONS

CROSS-REFERENCE TO RELATED APPLICATIONS

This application is related to U.S. patent application Ser. Nos. 14/951,060, 14/951,119, 14/951,135, filed on the same date herewith, which is hereby incorporated by reference.

FIELD OF THE INVENTION

The present invention relates generally to anomaly detection when a payment card is used. More specifically, the present invention relates to automatically comparing a risk metric from a current time window to that of a past time window.

BACKGROUND OF THE INVENTION

In this digital age, merchants are challenged by customers who want near instantaneous transactions across multiple channels and the need to reduce fraudulent transactions. At the same time, merchants struggle to enhance fraud detection for the rapidly growing market of digital goods.

With the prevalence of computers, mobile telephones and the Internet, buyers and sellers can now interact without seeing one another; card-not-present (CNP) transactions in which the merchant never sees the payment card are now much more common. As e-commerce becomes more popular and digital sales and delivery more common, merchants struggle to contain fraudulent payments without inconveniencing customers. A glitch during an e-commerce transaction can result in loss of the transaction for the merchant.

Unfortunately, card-not-present transactions—many of which are performed using computers, a telephone or mobile devices—are responsible for a great deal of fraud. Unfortunately, increasing fraud controls and tightening up fraud detection algorithms in order to detect fraud during a transaction can result in a good transaction being denied and a good customer being turned away. Most fraud detection systems are not yet able to handle the increase in online card-not-present transactions and especially the sale and delivery of digital goods.

No fraud detection system is perfect. Some amount of fraud will always occur in an on-line production system, resulting in chargebacks and losses for a merchant. Many systems attempt to address fraud during processing of a transaction through the use of fraud detection models that will not allow certain transactions. Indeed, transaction level fraud detection is known, making a decision about accepting or denying a transaction based upon some assessment of the risk level of that transaction. It is expected that a certain level of fraud will pass through the production system; this leads to a background fraud level that a merchant may find acceptable or can simply live with. Background fraud is characterized by multiple patterns without any single pattern dominating the fraud. By contrast, "special case" fraud occurs intermittently and is often part of a targeted attack by a fraudulent enterprise. Current techniques do not adequately address how to detect and prevent special case fraud. One reason is that prior art techniques look at transactions one at a time because of computational limits. Or, these techniques rely upon chargeback information which usually becomes available a few days after the transaction. This delay results in additional fraud losses because a fraudulent enterprise is able to exploit a weakness in the production system for a longer time.

Accordingly, new methods and systems are needed that allow a fraud detection system to detect and prevent special case fraud.

SUMMARY OF THE INVENTION

To achieve the foregoing, and in accordance with the purpose of the present invention, a payment processing system is disclosed that identifies anomalies in groups of transaction data.

The present invention analyzes characteristics of groups of transactions after order processing has been completed in order to identify fraud risk at the system level and to make changes in the online production system in order to address that risk. In contrast with prior art online production systems which are limited by computational resources and by time, off-line analysis of transactions after order processing has been completed can use more computational resources and can use more time to look for patterns or concentrations using a variety of anomaly detection metrics. Prior art systems based on chargebacks must wait for chargebacks to be reported. Since chargebacks may be reported anywhere up to 90 days after the transaction (depending on the cardholder agreement), there is a significant delay in waiting for chargeback information to arrive back at the merchant. Generally, chargeback data arrives between 7-90 days after the transaction. In addition to this delay in information about possible fraud, the delay allows fraudulent entities to exploit any deficiency in the production fraud prevention system for a longer time, resulting in increased losses.

Even though the present invention does not operate in real time and attempt to detect a fraudulent transaction online as it is occurring, it is able to detect active fraud before it is reported. For example, at a given point in time, the present invention analyzes a group of transactions in a measurement time window after processing has been completed. This measurement time window may be on the order of hours or days (for example) and analysis may begin immediately after the measurement time window. Accordingly, fraud may be detected and changes made to the online production system within minutes or hours after analysis has begun. I.e., once analysis of a particular measurement window begins, results are obtained and changes made quickly. Results can be obtained within minutes or hours, depending upon the data volume and the complexity of the data combinations used during calculation. Reaction time is largely limited by the frequency of the alerting processes that inform the data team of the activity. Reaction time can vary by system, but it is possible to deploy changes to a production system within about twenty minutes.

In addition to chargeback information, fraud may also be discovered after the fact using processes that look for commonalities across the orders, such as fraud investigation team specialists that look for patterns in transactions, but this is a time-consuming process. For example, a skilled human reviewer may, upon a lengthy examination of transactional order information, be able to discern patterns or groups deemed suspicious of being fraudulent. It takes time and training to reach such level of skill for a human.

BRIEF DESCRIPTION OF THE DRAWINGS

The invention, together with further advantages thereof, may best be understood by reference to the following description taken in conjunction with the accompanying drawings in which:

FIG. 6 is a table illustrating an example of transactions extracted from a particular measurement window.

FIG. 9 is an example of an alert table.

DETAILED DESCRIPTION OF THE INVENTION

As discussed above, an anomaly detection system is useful in the prevention of fraud involving payment cards in the payment industry. In one embodiment, the anomaly detection system is used within a global, online payment processing system such as that operated by Vesta Corporation of Portland, Oreg. The payment processing system is suitable for use with international card networks, local payment networks, and can process payments in numerous currencies.

It is realized that special case fraud typically has some unifying characteristic and is often seen as a localized-in-time increase in the fraud rate. The present invention provides anomaly detection that looks for special case fraud in some group of orders bound by any of a number parameters (e.g., time, partner, location, etc.). Typically, this is done post-order completion after the orders have been processed, and a decision is made based upon this group of orders. Analysis of a group allows for system-level fraud detection. Combining this anomaly detection with a notification feature allows for review of the identified anomaly for possible corrective action. Anomalies are identified prior to fraud information (chargebacks) being available, for example, by a surrogate. For example, in some cases of fraud, a ZIP (or postal) code may be a surrogate for fraud because during a fraud event (attack) all of the orders from a certain ZIP code eventually result in chargebacks. In this case the ZIP code is a surrogate for chargebacks.

Payment Processing System Overview

Figure 1:
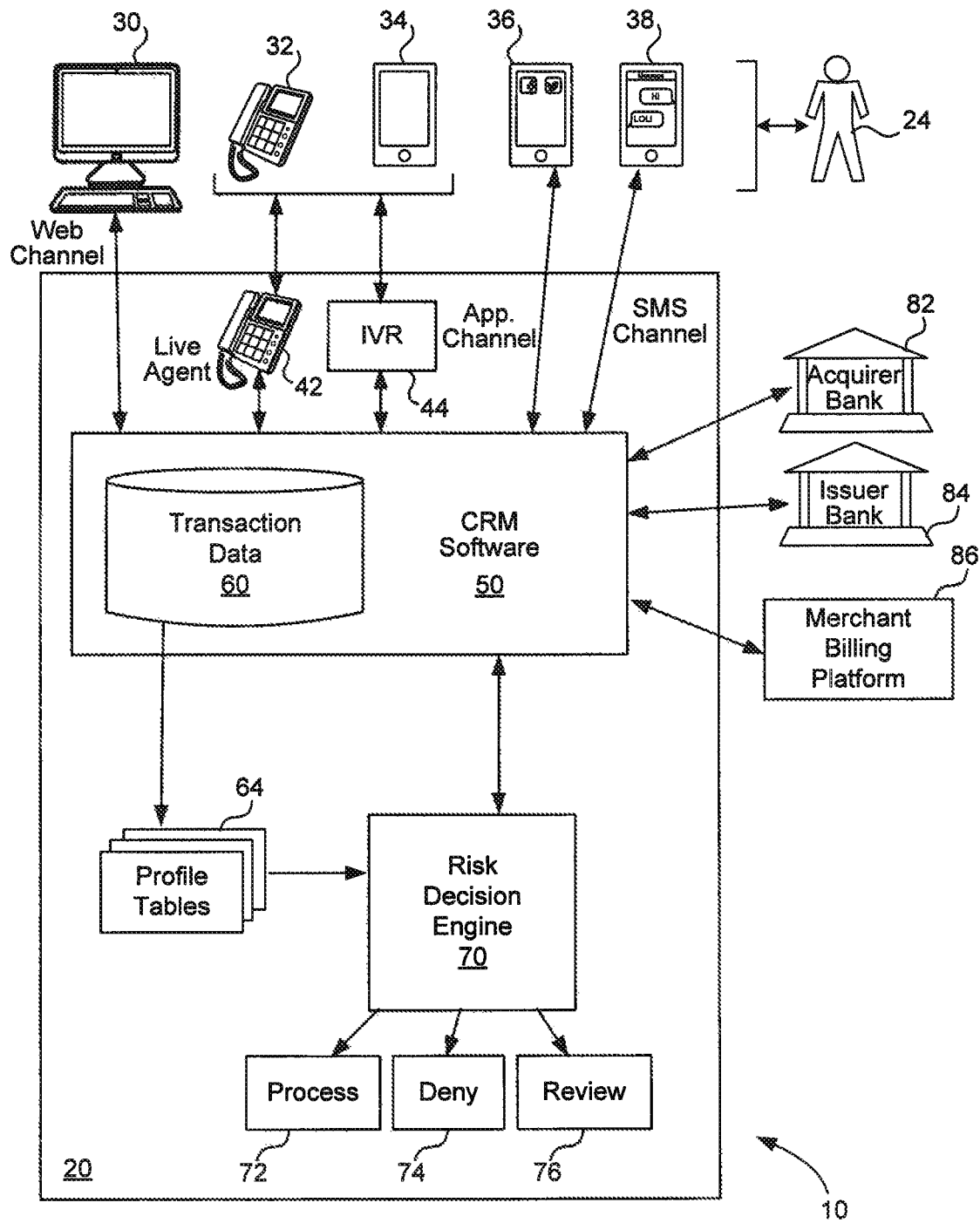
FIG. 1 is an example of a payment processing system that includes an anomaly detection system.

FIG. 1 illustrates an exemplary payment processing system 10 according to one embodiment of the invention that includes an anomaly detection system. An individual 24 desires to process a transaction using a payment card and utilizes any of channels 30-38 that communicate with an enterprise processor 20 in order to determine whether or not to process the transaction. The transaction may be to provide payment for any type of physical goods, for digital goods, or for a service such as recharging a mobile telephone or device, topping up a mobile telephone, incrementing a prepaid account, bill payment, money transfer, digital download, electronic tickets, online games, online gambling, and so on. The digital goods may include airline tickets, event tickets, gift cards, virtual gift cards, reloading money onto a gift card, digital music, credit for games, etc. The payment card (not shown) that the individual desires to use may be a credit card, a charge card, a debit card or another physical card, or even a virtual card such as PayPal, crypto currency, eCheck and so on. In general, the transaction is a card-not-present (CNP) transaction because although the individual 24 is in possession of the card (or at least knows the card number, expiration date, etc.), the merchant is unable to see the card because the individual is remote and is using an electronic channel in order to complete the transaction.

The channels include a Web channel in which the individual typically uses a computer 30 (desktop, laptop, tablet, etc.) in order to submit a transaction to the processor 20, although the individual may also use a mobile telephone with a Web browser to submit a transaction. More traditionally, the individual may use a corded or cordless telephone 32, or a mobile telephone 34, in order to submit a transaction via a live agent channel 42, or via an interactive voice response (IVR) channel 44. An application on a mobile telephone 36 may also be used to submit a transaction via an "app" channel, and mobile telephone 38 may be used to submit a transaction via an SMS channel in which text messages (or similar) are used. A "text-to-pay" channel may also be used with mobile telephone 38. Although not shown, another possible channel is an automatic recurring top-up of a prepaid account of a mobile telephone (for example); such an automatic transaction may not necessarily be initiated by the individual, but may be generated from within processor 20.

As is known in the art, telephone 32 may use the Public Switched Telephone Network (PSTN), and wireless devices 34-38 may use a wireless network such as any digital or analog cellular network, a PCS network, a satellite network, a radio frequency network, or other similar wireless network to communicate with an enterprise 20. Computer 30 may use an Internet Service Provider to connect over the Internet to enterprise 20.

As one of skill in the art will appreciate, individuals around the world are using these channels and others to submit transactions that are forwarded to processor 20 around-the-clock, resulting in a constant order flow that is handled by customer relationship management (CRM) software 50. CRM software 50 is executing upon any suitable server computer or computers within an enterprise 20. The same computer (or others) may also be used by enterprise 20 to host the IVR system 44, the risk decision engine 70, or for other functions needed to implement the payment processing system.

As will be appreciated, the incoming order flow from these channels includes a variety of data that is not only specific to a particular transaction but also may be specific to the channel being used by the individual, and, certain data is collected and stored for each transaction. For each transaction, the CRM software stores into transaction data 60 a record of each transaction, typically storing data elements such as: payment card number (which may be encrypted), expiration date, name and address of the individual, geographical location where the individual is located, amount of the transaction, e-mail address, shipping name and address, IP address of the computing device being used, telephone number of the channel being used, device information of the computing device being used, Internet service provider (ISP) being used, device fingerprint and related device characteristics, social media network linkages, etc.

Continuously, or periodically, the information records in transaction data 60 are used to generate any number of profile tables 64. A profile table is basically a counter based upon a particular data element found within transaction data 60. For example, a profile table for a payment card number may indicate the number of transactions attempted per particular payment card the day before, during the last week, during the last three months, etc. A profile table for the data element bank identification number or BIN (the first six digits of the payment card number which identifies a bank) may indicate the number of transactions attempted per issuer in a particular time period. Or, a profile table for ZIP code indicates the number of attempted transactions originating from particular ZIP codes in a given time period. Because the order flow is constant, the profile tables are updated in real time as transactions are stored within transaction data 60.

As will be explained in greater detail below, risk decision engine 70 includes algorithms to process an incoming transaction, and using profile tables 64, makes a decision as to whether to process a transaction 72, to deny a transaction 74, or to submit a transaction for further manual review 76. The outputs 72, 74 or 76 from risk decision engine 70 may take the form of computer instructions given to CRM software 50, may be output onto a display of a computer screen, may be printed, may be output via a speaker, etc. The outputs may also be used as input into another algorithm for further analysis or may be fed back into the decision engine in order to directly alter the behavior of the on-line production system related to fraud.

Accordingly, the risk decision engine may direct the CRM software 50 to communicate with the acquirer bank 82, communicate with the issuer bank 84 and communicate with the merchant billing platform 86 (such as for a telecommunications carrier) about whether or not to recharge a particular telephone, whether to reload money onto a virtual gift card, whether or not to ship the physical or digital goods that the individual wishes to purchase, etc. For example, if the decision engine 70 decides to process 72 a transaction, then an authorization is requested from the issuer bank (typically via the acquirer bank), the merchant 86 is directed to deliver the goods or services to the individual, and eventually the issuer bank settles with the acquirer bank. If the decision engine decides to deny 74 a transaction, then no payment settlement is sent, and the merchant is informed that the transaction is denied (and no goods or services will be delivered).

Anomaly Detection Overview

Figure 2:
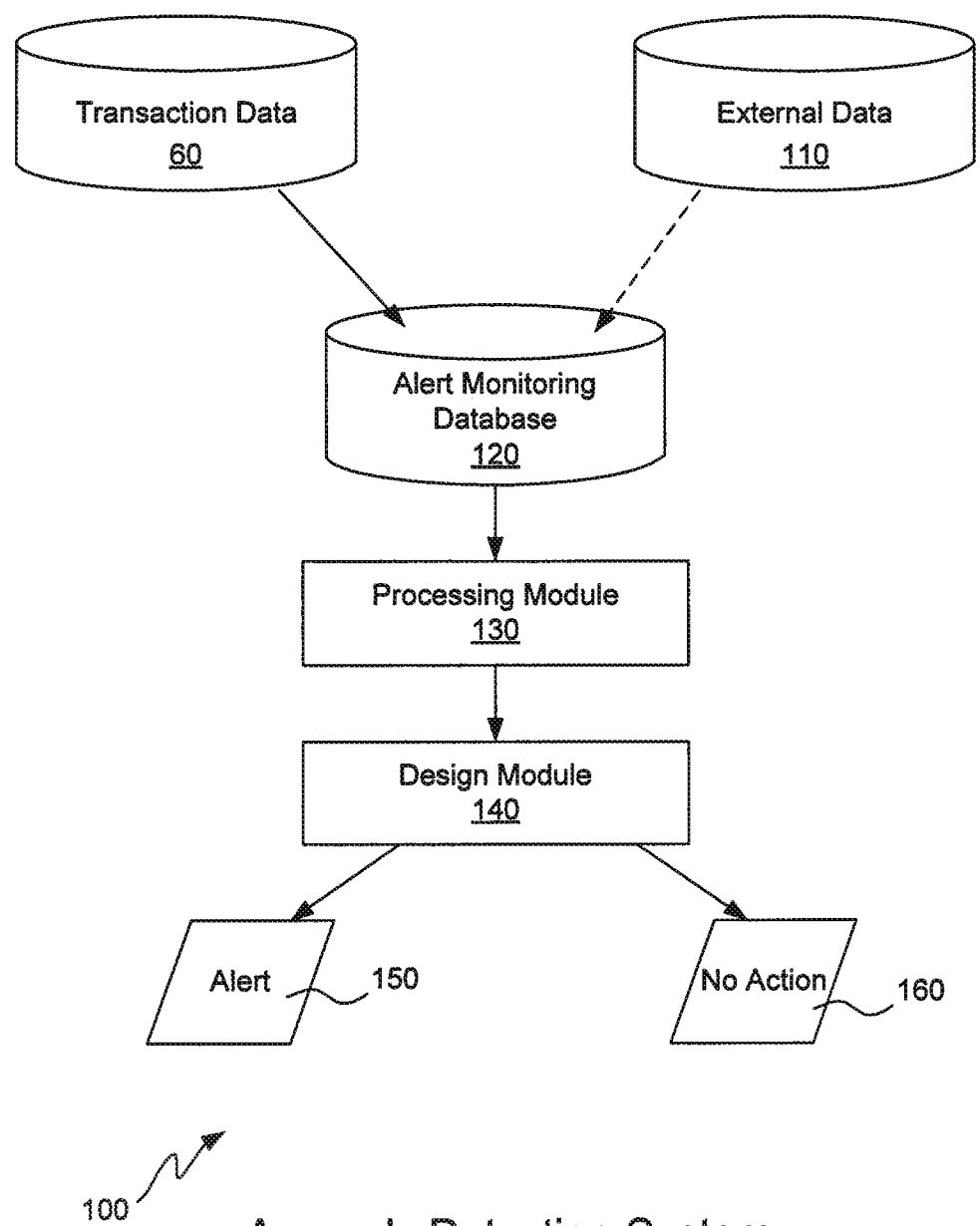
FIG. 2 is an anomaly detection system according to one embodiment of the invention.

FIG. 2 illustrates an anomaly detection system 100 according to one embodiment of the invention. System 100 may be implemented upon the computer used by engine 70, or upon other computers within an enterprise 20. As mentioned above, the payment processing system of FIG. 1 includes a risk decision engine 70 that uses transaction data 60 to make decisions in real time as each transaction is processed. Transaction data 60 is also used in the anomaly detection system 100 to detect anomalies after transactions have occurred, but before any chargeback is reported. System 100 is able to detect anomalies on the order of seconds after the measurement window has closed (depending on data volume, computational resources, and input/output capabilities) up to several hours.

External data 110 is any of a variety of third-party databases that the system may use to supplement the transaction data. This external data includes address verification and validation, device fingerprinting, e-mail name verification/validation, address cleaning, credit scoring, name verification/validation, geolocation verification/validation, etc.

Alert monitoring database 120 includes a group of any number of transaction records from transaction data 60 that meet certain criteria such as a time range, a particular merchant or merchants, a location, a particular channel, or any available parameter present within a transaction. Examples include "all transactions for a particular merchant for the past week," "all transactions the previous day originating via an SMS channel," "all transactions in the past eight hours where the billing city is Fremont," "all transactions from the Web channel, from a particular partner, having the device operating system return as "Windows 95,"" "all transactions with a billing ZIP code of 83704 where the calculated distance from the IP address ZIP code is greater than 150 miles," "all transactions that occurred between 2 a.m. and 8 a.m. PST where the IP address begins with 172.122," etc. A group of records is pulled from transactional data 60 (and optional data from external data 110) periodically, such as every 6 hours, every calendar day, a rolling 24-hour period recalculated every 4 hours, etc.

Processing module 130 implements a variety of risk metric calculations using the group of transaction records in the alert monitoring database in order to rapidly determine with reasonable accuracy if a fraud attack has occurred (and is still occurring), by calculating the deviations of, for example, new payment device proportions, mismatched addresses proportions, the distance distribution from the IP geolocations to the billing addresses from the norms, etc. As illustrated by the multiple arrows leading from database 120 to the processing module 130, one or more of these calculations may operate in parallel upon the group of transaction records in the alert monitoring database, thus calculating a wide variety of risk metrics that may lead to a determination that a fraud attack is occurring.

Decision module 140 uses the results from the processing module in order to determine if a fraud attack is occurring and that an alert 150 should be generated, or that no anomalies are present (or at least no anomalies with a significant business risk) and that no action 160 should be taken. If an alert is generated, then action is taken such as blacklisting, velocity adjustment, model change, etc., as described in more detail below.

Figure 3:
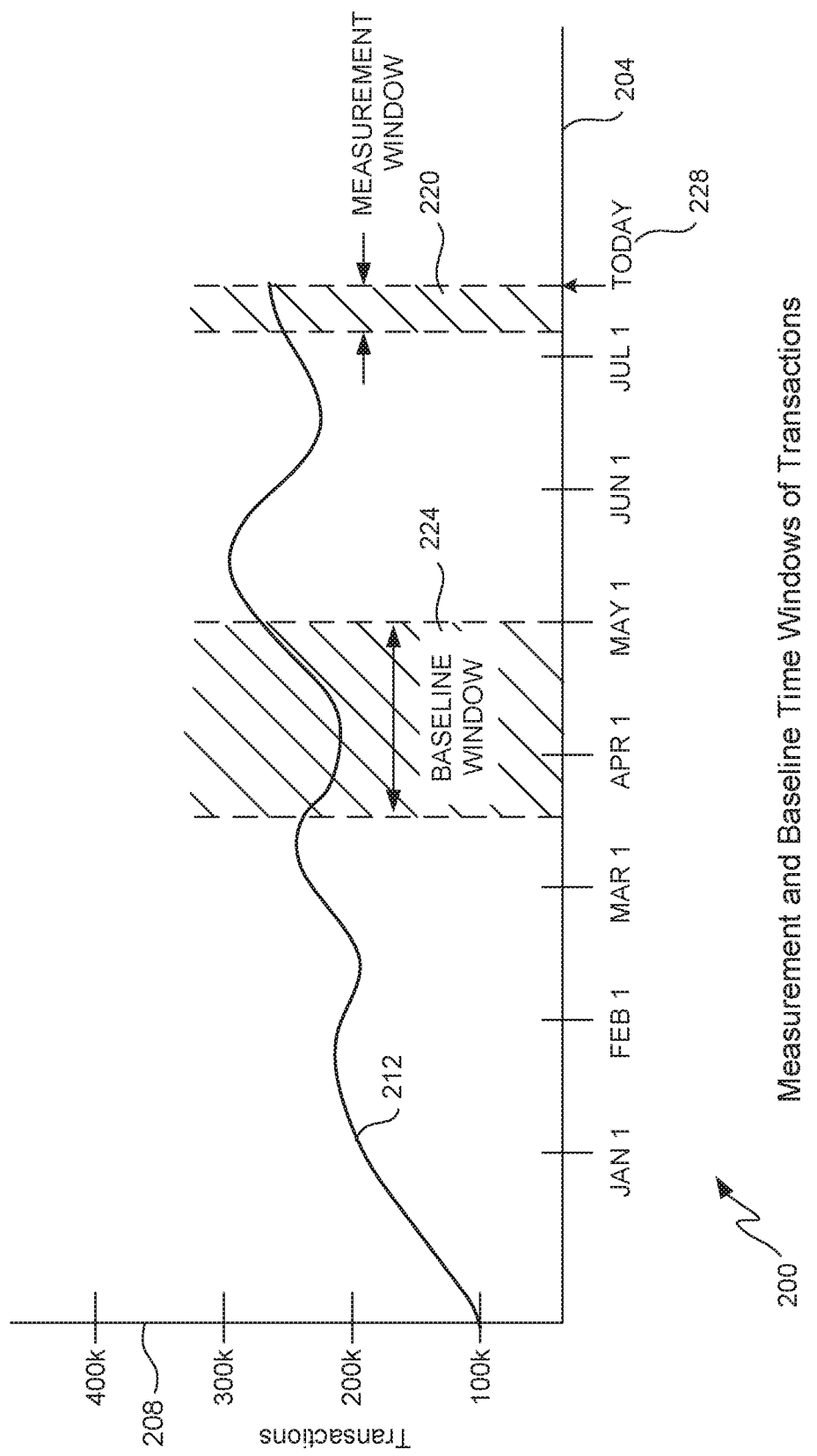
FIG. 3 is a graph showing measurement and baseline time windows that include transactions that have occurred within those windows.

FIG. 3 is a graph 200 showing measurement and baseline time windows that include transactions that have occurred within those windows. Shown is a timeline 204 over which any number of transactions 208 are occurring around the clock. Plot 212 is an example of the number of transactions that are occurring at particular times and on particular days throughout a given year. The present invention is able to compare characteristics of attributes of transactions that occur within a particular measurement window 220 to characteristics of those same attributes that occur within a baseline window 224 in the past. In one example, comparisons are made on a given day 228 in which the measurement window 220 immediately precedes the day or time on which the comparisons are made in order to rapidly detect a possible pattern of fraud during the immediately preceding measurement window. The measurement window 220 and the baseline window 224 may be any length of time (e.g., hours, days, months, etc.) and each window may have a different length of time. Advantageously, particular risk metrics are calculated in both the measurement window and in the baseline window and then compared to determine whether or not to raise an alert based upon a particular risk metric.

Figure 4:
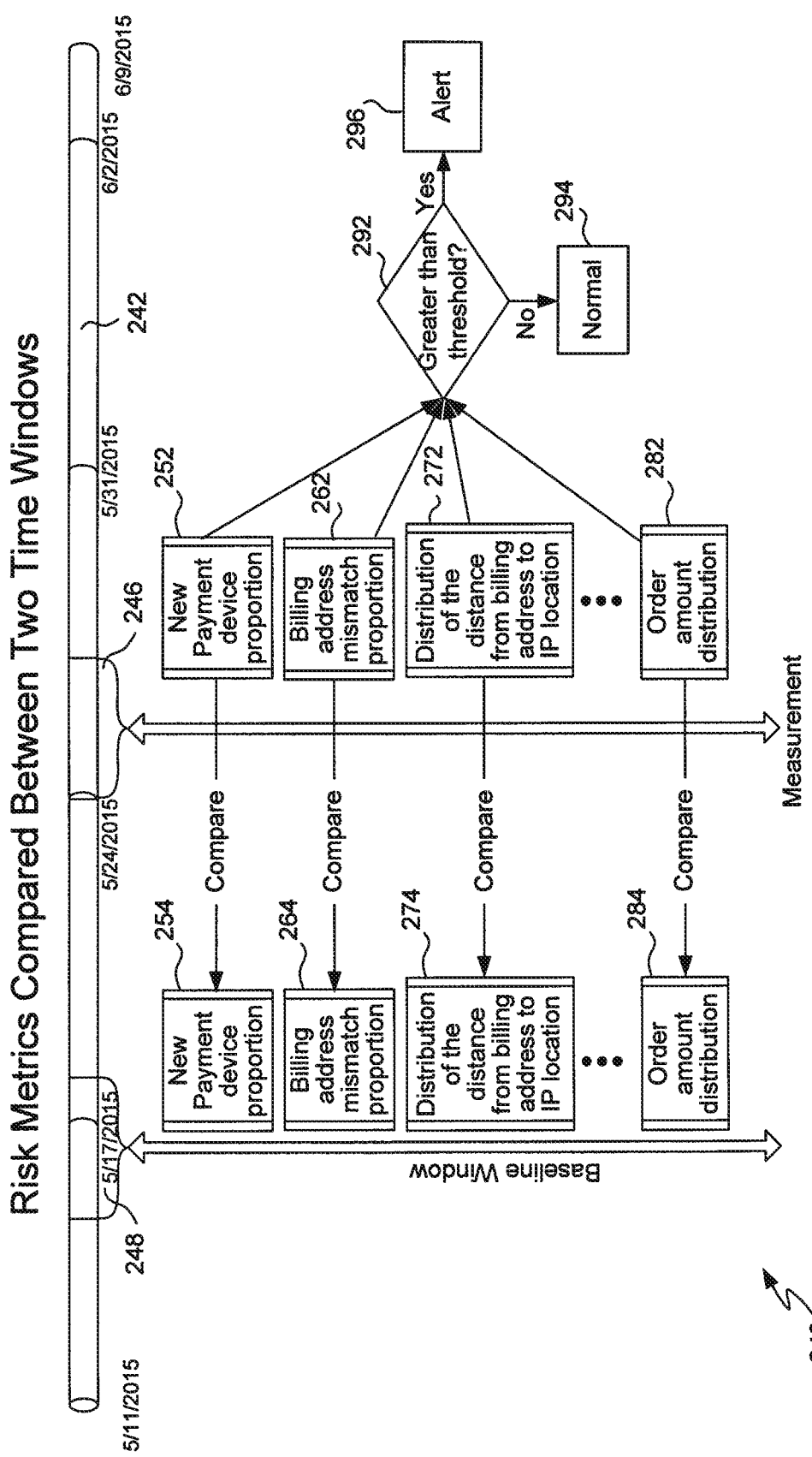
FIG. 4 is a sampling of risk metrics that are compared between two different time windows.

FIG. 4 illustrates a sampling of risk metrics 240 that are compared between two different time windows. Shown is a timeline 242 indicating various dates (e.g., May 11, 2015, May 17, 2015, etc.) during which transactions are occurring and are captured by system 10. Measurement window 246 is a time period during which any number of risk metrics are calculated based upon transactions occurring within that window 246 (preferably being calculated immediately after the end of the time period) and baseline window 248 is an earlier time period in which the same risk metrics are calculated based upon transactions occurring within that window 248. A particular risk metric from the measurement window is compared to the same risk metric from the baseline window in a decision 292 and if the result is not greater than a threshold the no action is taken. If the result is greater than a threshold, then an alert 296 may be generated based upon that particular risk metric. By way of example, the proportion of new payment devices 252 occurring within measurement window 246 is compared to the proportion of new payment devices 254 occurring within baseline window 248; a result greater than a threshold leads to an alert. As will be described below, decision 292 may be more complex. In addition, as shown, other risk metrics such as billing address mismatch proportion 262, distance from billing address to IP location 272 and order amount distribution 282 (among others) may also be compared between the measurement window and the baseline window. Each of these risk metrics may result in an alert being generated and action being taken.

Anomaly Detection Flow Diagrams

Figure 5:
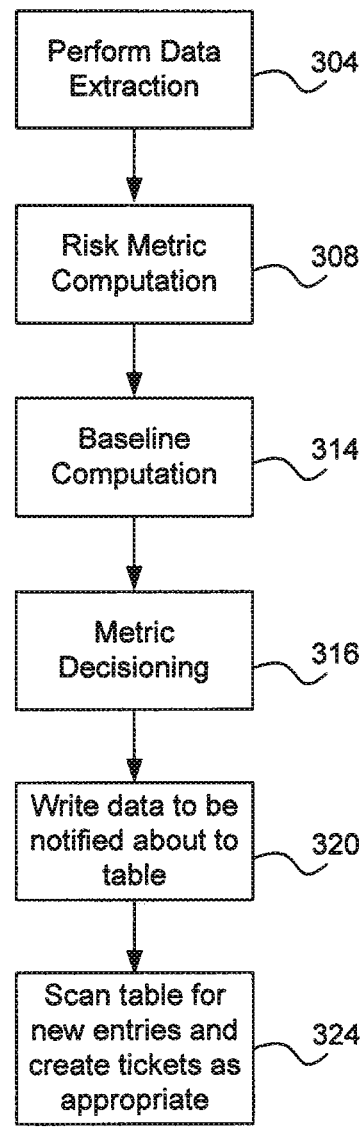
FIG. 5 is a flow diagram describing one embodiment by which anomaly detection is performed.

FIG. 5 is a flow diagram describing one embodiment by which anomaly detection is performed. Generally, steps 304 to 314 are performed within the processing module, and steps 316-324 are performed within the decision module and as part of the process of generating an alert 150.

In a first step 304 a group of transaction records are extracted from transaction data 60 based upon particular criteria and transferred to the alert monitoring database 120. Typically, the criteria will be time-based, such as recent transactions within any previous number of hours, within any previous number of days, etc. And, a group of transaction records may be selected from multiple points in the past such as "all transaction records from yesterday and all transaction records from one week ago during a particular day." The criteria may be based upon other attributes of the transactional data such as order date, time of day, merchant, partner, channel, product, etc. The criteria may also use multiple attributes. This first group of records forms the measurement window and a second group of records extracted from the transaction data forms the baseline window as explained above. Although the baseline and measurement windows represent different time periods, the other criteria used to extract each will be the same, meaning that the transactions from the two windows will be comparable, and results meaningful, e.g., if the measurement window includes all transactions "from merchant A via channel B," then the baseline window will also include all transactions "from merchant A via channel B."

Typically, transactions in which fraud was known to have occurred (i.e., there was a chargeback) are allowed to be present within the measurement window, while transactions known to be fraudulent (i.e., there was a chargeback) are excluded from the baseline window. And, depending upon the risk metric being implemented in steps 308 and 314 below, different time windows may be used. The time period of the measurement window is based upon the time during which an analysis is desired and will depend greatly upon external factors at the time of analysis, although typically a measurement time window is on the order of 24 hours. Preferably, a measurement window immediately precedes the time of the analysis, i.e., an analysis may be performed immediately after the measurement window ends, and is preferably performed within 24 hours after the measurement window.

And, although a baseline window may be at any point in the past and may be of any length, it has been found that a baseline window stretching from about three months prior to the time of analysis to about one month prior to the time of analysis works well. Although the calculation of many risk metrics may use transactions from the measurement window and from a baseline window, some metrics merely need the recent data from the measurement window in order to perform their calculations. For example, velocity, counts, and rates all use data only from the measurement window to arrive at a value. In these instances, data from the baseline is used to calculate a threshold; when the threshold is crossed, this indicates an unacceptable risk of fraud being present. Alternatively, thresholds may be determined in other manners and introduced into the decision process.

As mentioned, extraction may occur as described, and the time from which extraction occurs to the possible generation of an alert 150 is on the order of several seconds to several minutes depending on several variables (data volume, computational resources, I/O bandwidth), etc. Once risk metrics have been calculated for the extracted data, a decision has been made, and possibly an alert generated as described below, the data in database 120 may be discarded and a new group of transaction records may be extracted and analyzed.

Steps 308 and 314 help determine whether or not the extracted data from the measurement window is anomalous or not. In other words, any of a variety of risk metrics may be calculated and then decisions made below in step 316. Examples of risk metrics include the following: (1) the "IP Address to Payment Device Distance" risk metric calculates the proportion of orders within a time window that have a distance from the order IP address to the ZIP code geolocation of the payment device used that are over a particular limit; (2) the "IP Address to New Payment Device Distance" risk metric calculates the proportion of orders within a time window that have a distance from the order IP address to the ZIP code geolocation of the payment device used (where the age of the payment device is under a particular limit) that are over a particular limit; (3) the "MDN (mobile device number) to Payment Device Distance" risk metric calculates the proportion of orders within a time window that have a distance from the order recharge telephone number area code geolocation to the ZIP code geolocation of the payment device used that are over a particular limit; (4) the "New Payment Device" risk metric calculates the proportion of orders within a time window in which the time between the creation date of the payment device to the order date is younger than a particular limit; (5) the "New Stored Value Account" risk metric calculates the proportion of orders within a time window in which the time between the creation date of the stored value account and the transaction day is younger than a particular limit; (6) the "Chargeback Rate" risk metric calculates the ratio of orders within a time window having a chargeback to the total orders (using order count or order amount); (7) the "Fail Rate" risk metric calculates the ratio of bank-failed orders within a time window to attempted orders; (8) the "Proportion BIN Country" risk metric calculates the proportion of orders within a time window in which the payment device has a BIN indicating banks in a particular country; and (9) the "Velocity" risk metric calculates the amount of orders within a time window (by order count or by order amount) over a given amount of time.

In addition, the "Ratio of Proportion" risk metric calculates the ratio of two proportions taken at different points in time in order to evaluate the increase or decrease in activity of a particular attribute value. Using screen resolution as an example, it is known that a variety of screen resolutions are present in the marketplace and it is possible that fraud may be perpetrated on devices having a particular screen resolution. The proportion of a specific screen resolution being used during a measurement window is calculated, as well as the proportion of that same screen resolution being used during a past time period, the baseline window. The ratio of the current proportion over the past proportion may then be taken as an indicator of possible anomalous behavior.

The above risk metrics are examples of calculations that may be performed upon the extracted data in a particular time window; other risk metrics may also be used such as velocity, rate of increase, rate of occurrence, counts, etc. As will be explained below, a given risk metric is calculated not only for an attribute in the measurement window but also for the same attribute in the baseline window and the results are compared in step 316. The below figures use the specific example of calculating the risk metric "New Payment Device," but, one of skill in the art will easily be able to use this disclosure to calculate the other risk metrics mentioned above.

FIG. 6 is a table 400 illustrating an example of transactions extracted from a particular measurement window. In this simple example, transactions within the measurement window are for a specific merchant on a specific day and have been extracted in step 304 for use in calculating the specific risk metric "New Payment Device." For clarity, the table does not show all potential data from the transactions that may be used with others of the risk metrics, and, only a single attribute "screen resolution" is shown. Further, not every possible attribute value is shown for that attribute, nor is every transaction for all possible attribute values shown. Thus, table 400 shows a sample of transaction data used to calculate a specific risk metric from a particular measurement window. One of skill in the art will easily be able to extend this concept in order to calculate other risk metrics, using different measurement and baseline windows.

As shown, column 404 lists a particular attribute "screen resolution," and for each transaction, an attribute value, namely, one of three different screen resolutions of a computing device used by individual 24 to submit a transaction. Of course, other attribute values are possible and not all transactions are shown for the latter screen resolutions. Column 408 indicates a particular order number, and may include a unique identifier for each transaction. Column 412 indicates the particular payment device (e.g., a payment card such as a credit card or debit card) used in the transaction and typically includes a unique number associated with that payment device. Column 416 indicates the creation date of that payment device within payment processing system 10 implemented by enterprise 20. In other words, the creation date is a date on which enterprise 20 first processed a transaction from a particular payment device and entered an instance of that payment device into its system. Column 420 indicates the date when the transaction was submitted by the payment device. Column 424 is the dollar amount of each transaction. Finally, column 428 represents a calculated value specific to this particular risk metric, i.e., it does not include information extracted from the measurement window.

Figure 7:
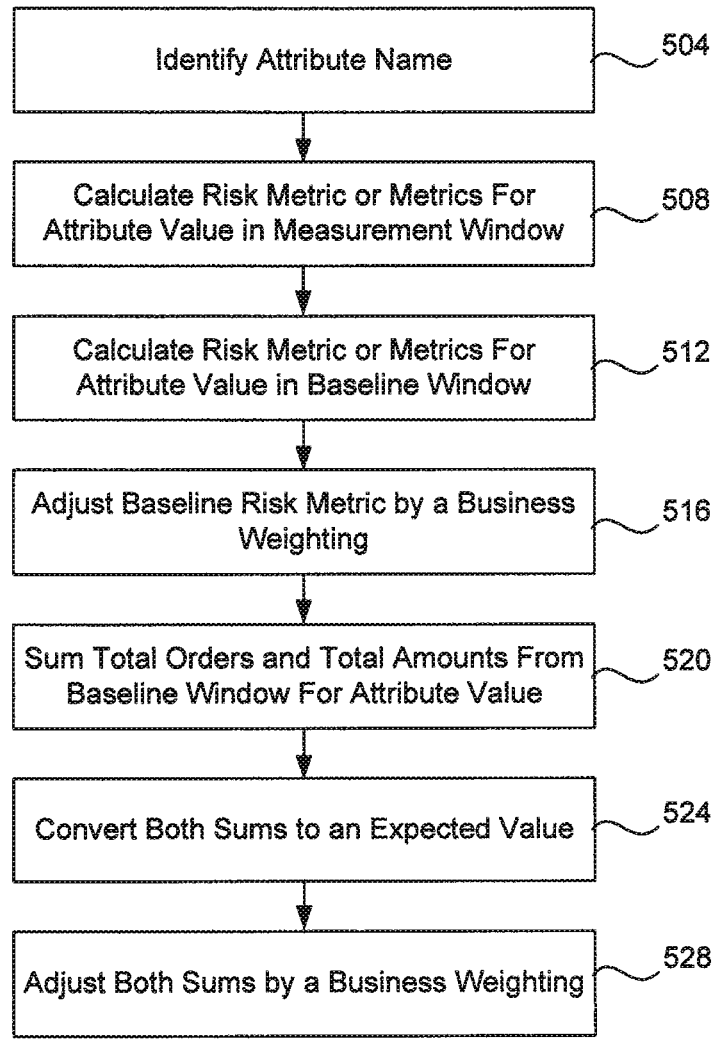
FIG. 7 is a flow diagram describing one embodiment by which a risk metric is calculated for an attribute in the measurement window and in the baseline window.

FIG. 7 is a flow diagram describing one embodiment by which a risk metric is calculated for an attribute in the measurement window and in the baseline window (steps 308 and 314). As mentioned, table 400 represents extracted data from the measurement window; although not shown, a similar table represents extracted data from the baseline window and would, of course, include different transactions from different dates.

In a first step 504 an attribute of the transaction data is identified for analysis and risk metric calculation. One advantage of the present invention is that it uses multiple passes over the extracted data in order to analyze particular attributes that are of interest. For example, if it is desired to know whether fraudulent transactions are originating from computing devices having particular screen resolutions, then the attribute "screen resolution" may be analyzed in a particular pass. Other attributes that may be analyzed in each pass include channel, order amount, ZIP code, BIN, city, e-mail name, e-mail domain, IP address (and its parts), billing area code, browser language, Flash version, screen resolution, etc. As shown in FIG. 6, the particular pass used in this example calculates risk metrics based upon the attribute "screen resolution" and its possible values in each transaction. Other passes may analyze other attributes using their possible values.

It should be noted that certain attribute values may have been placed into an exclusion table in step 320. This exclusion table is checked at the beginning of step 308, and, if the attribute value in question is in an exclusion table then that particular attribute value is ignored for this pass and the next attribute value may be checked. For example, if a large number of transactions are being generated from a particular computer within a corporation, and this is legitimate, then the device identifier of the computer may be placed into the exclusion table.

Once an attribute has been identified for the current pass, then in step 508 a particular risk metric is calculated for a particular attribute value for transaction data extracted from the measurement window, such as data shown in table 400. As mentioned above, any of a variety of risk metrics may be used, and more than one risk metric may be calculated for a particular attribute name at this time. In this specific example, considering only those transactions in which the attribute value is a "112×112" screen resolution, the age of the payment device will be considered using the "New Payment Device" risk metric. With this metric, the difference between the order date and the creation date is taken into account, and a proportion is determined of orders in which the payment device is younger than a particular limit. In this example, the age limit is determined to be seven days, although the limit may be any other number of days or even a number of hours. Further, each particular risk metric that uses a limit may have a different limit, whether that limit is in units of time, distance, etc.

Next, the metric determines the proportion of orders (out of all orders for that particular attribute value) where the payment device age is less than the age limit. For example, because the first two orders shown in table 400 have an age equal to one day, and because the total number of orders for that screen resolution is five, then the proportion (or measurement risk metric) is 2/5. Or, the proportion may use the dollar amount of the orders instead of the number of orders. For example, because the first two orders shown in table 400 have an age equal to one day and their amounts total $800, and because the total dollar amounts of all orders for that screen resolution is $933, then the proportion (or measurement risk metric) is 800/933. Either order count or order amount may be used for the risk metric as long as the calculation used in the baseline window is consistent. Now that the measurement risk metric has been calculated the baseline risk metric may be calculated.

Next, in step 512 the same risk metric (in this example, "New Payment Device") is calculated based upon the same attribute value for transaction data extracted from the baseline window in step 304 rather than for transaction data extracted from the measurement window. As shown in FIG. 3, an example baseline window 224 occurs prior to the measurement window and may span days, weeks or months, and is not necessarily the same length as the measurement window. This transaction data extracted from the baseline window may appear as shown in table 400, although other than the attribute values, the actual data will be different because it is based upon different transactions from a different time period. Thus, step 512 determines the proportion of orders (out of all orders for that particular attribute value) where the payment device age is less than the age limit. As in step 508, either order count or order amount may be used, as long as the calculation is consistent. Now that the baseline risk metric has been calculated it may be adjusted.

In step 516 the baseline risk metric is adjusted by a business weighting. Because the measurement risk metric will be compared to the baseline risk metric below, the baseline risk metric functions as a threshold, and it may be desirable to adjust that threshold for business reasons. For example, using the metric "New Payment Device" as an example, if the baseline risk metric is seen as too low of a threshold, and too many false positives are generated when the measured risk metric is compared to the baseline risk metric, then the baseline risk metric may be multiplied by a weighting of 1.5, for example, in order to increase that threshold. Thus, it would take a larger number of new payment devices in the measurement window to trigger an alert. Conversely, if the baseline risk metric is too high, and fraud is occurring, then the baseline risk metric may be multiplied by a weighting of 0.5, for example, in order to decrease that threshold. Thus, a fewer number of new payment devices in the measurement window would trigger an alert. This step is optional and it is not required to use a business weighting.

In the metric decisioning step 316 described below, the dollar amount of transactions and the order count of transactions in the measurement window will also be compared to baseline values, but first, these baseline values are adjusted as will now be described in steps 520-528. Accordingly, in step 520 a total count of all orders and a total amount of all orders is calculated for all transactions in the baseline window corresponding to the current attribute value (e.g., a screen resolution of "112×112"). But, because the baseline window may not be the same size as the measurement window, in step 524 both sums are converted to an expected value, i.e., both sums are normalized with respect to the size of the measurement window in order to obtain an adjusted baseline dollar amount and an adjusted baseline order count. Next, in step 528 both of these adjusted sums may also be further adjusted by a business weighting such as has been described above in step 516. For example, if a business decision is made that an increase of one half of the total volume of relevant transactions (of either order count or order amount) is noteworthy, then the weighting factor will be 0.5.

Therefore, steps 308 and 314 determine a measured risk metric, a baseline risk metric, a measured dollar amount, and a measured order count (the latter is three perhaps being further adjusted), for a particular risk metric corresponding to a particular attribute value. Next, a decision is made regarding whether these measured values represent anomalous behavior as explained below.

Figure 8:
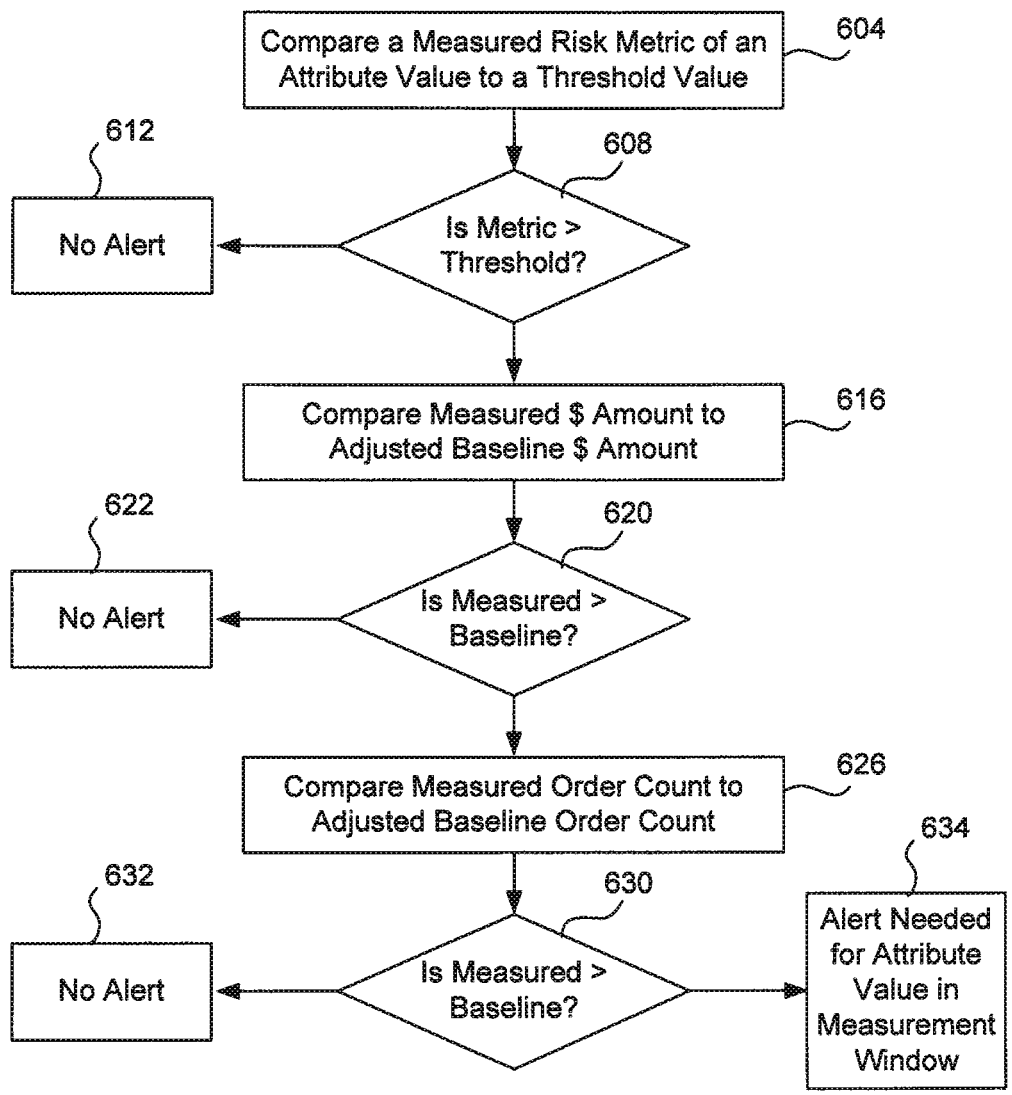
FIG. 8 is a flow diagram describing in detail step 316.

FIG. 8 is a flow diagram describing in detail step 316. In step 316 metric decisioning is performed in which the risk metrics that were computed in step 308 are compared to baseline threshold values determined in step 314, to determine whether or not an alert is needed for a particular attribute value within the measurement window. For example, continuing with the example in which the attribute is "screen resolution," and in which a risk metric is computed for the attribute value "112×112" screen resolution, this step will determine whether or not an alert is needed for transactions originating from computing devices in which the screen resolution is "112×112". Of course, step 316 may be performed for any attribute of a transaction, and any of a variety of risk metrics mentioned above may be used. Preferably, step 316 is performed for each of the risk metrics computed in step 308, each of which may trigger an alert.

Thresholds are used to determine if a risk metric (or a group of risk metrics) exceed a value indicative of anomalous behavior. Thresholds may be determined from the baseline window, hard-coded values, regularly recalculated values, adjusted values with information from current activity on-the-fly, or algorithmically determined on-the-fly from current or past information. Hard-coded values are often used for business rules when there is little expected change in the threshold over time, or the experience of a researcher indicates a particular value has meaning (e.g., only flagging an anomaly when the fraud loss potential is over 1,500). While hard-coded values may be intuitive, or may be found through statistical (or the mathematical) analysis and then hardcoded, regular recalculation of other threshold values may occur each time a risk metric is calculated, up to recalculation for every 1,000 risk metric calculations. Hard-coded values are typically determined from experience meaning that experimentation may be needed to determine the best threshold value to not only detect fraud but also to limit false positives. It is realized that an effective anomaly detection system (i.e., a good detection rate of fraud with an acceptable false positive rate) compares not only a risk metric to a threshold value, but also compares the dollar amount of orders and the order count to threshold values, as will be described below. In one embodiment described below, the adjusted baseline risk metric is used as a threshold to which the measured risk metric is compared.

In step 604 a measured risk metric for a particular attribute value is compared to a threshold which is the adjusted baseline risk metric. Typically, there will be a different threshold value for each attribute value (i.e., there will be a different threshold value for each particular screen resolution) because baseline data is used, although it is possible to use a single threshold value for each attribute name.

In step 608 it is determined whether the measured risk metric is greater than the threshold value corresponding to that attribute value, if not, then in step 612 no alert is necessary for that particular attribute value. If so, an alert may be necessary, but first it is also determined whether or not the measured dollar amount and the measured order count corresponding to the attribute value are greater than particular measured baselines. Alternatively, it may also be determined that the measured dollar amount and the measured order count are lower than a threshold. In the examples given, all measurements used show increasing risk with increasing value, that is, as the value of the measurement increases the risk of fraud also increases. Therefore, at some level (defined by the threshold), the risk becomes high enough to warrant an alert. There are measurements where an increase in risk occurs with decreasing value—such as one based on order diversity on a characteristic—often these are some type of inversion of an increasing value with increased risk measurement type. In such instances, a lower limit threshold may be used, one in which the risk became high after the value dropped lower than the threshold.

Accordingly, in step 616 the measured dollar amount for all transactions occurring within the measurement window having the particular attribute value (e.g., all transactions in which the screen resolution of the computing device was "112×112") is compared to the adjusted baseline dollar amount (from step 314). In step 628 it is determined whether the measured dollar amount is greater than the adjusted baseline dollar amount, if not, then in step 622 no alert is necessary for that particular attribute value. If so, an alert may be necessary but only after the measured order count is compared.

Accordingly, in step 626 the measured order count for all transactions occurring within the measurement window having that particular attribute value is compared to the adjusted baseline order count (from step 314). In step 630, if not greater, then in step 632 no alert is necessary for the particular attribute value. If so, then step 634 determines that an alert is needed for the particular attribute value in question based upon transactions from the measurement window. How such an alert is handled will now be explained in steps 320 and 324.

In step 320, assuming that an alert has been generated in step 316, data regarding that alert is written to an alert table. Data will be written for each measured risk metric that generates an alert. Writing such data to an alert table allows the prior decisions that have been made regarding the need for an alert to be collected in one place and allows for future actions. Writing such data to an alert table is not strictly necessary; once an alert is generated in step 634, the alert data may be immediately output such as by displaying on a computer screen, sending an e-mail message, printing the data, generating an audio alert, etc. Once output, a human may also take action upon the data as described below.

Examples of data that may be written to the alert table include the criteria used to make the alert decision, the attribute name and value, the partner, date, time window size, the specific transactions that caused the alert, etc.

FIG. 9 is an example of an alert table 700. This example shows numerous attribute names for which a particular risk metric calculation (in this example, New Payment Device) has resulted in an alert. Included within the table for each attribute name is: the date when the alert was created 704; an identifier 708 indicating the particular partner who has submitted the transactions; a particular channel 712 which indicates a method of ordering; the attribute name 716; the attribute value 720; the measured risk metric 724 (in this case the proportion of orders having a new payment device creation date younger than seven days at the time of order); the threshold value 728 to which the risk metric is compared; the measured dollar amount 732, the threshold dollar amount 736; the measured order count 740; and the threshold order count 744.

In step 324 once the alert data has been written to the table, this information may be transferred to a workflow process in order to take appropriate action. The workflow process may be a traditional issue notification/tracking system (e.g., creation of new tickets), or may be any other suitable process used to review the anomaly and respond. In one example, each table entry (row) is output into a traditional workflow process that creates a ticket (or tickets) that may be handled automatically or subject to human review. Automatic handling may result in faster resolution of the alert, but could create more false positives or other business risks depending upon the type of the alert.

The actions that may be taken upon a given alert will depend upon the attribute name. For example, while it is common to blacklist a particular credit card number which is an attribute value, it is unlikely that a particular screen resolution value would be blacklisted. Actions that may be taken include: blacklisting a particular attribute value (such as a credit card number or BIN value); placing a velocity adjustment on the particular attribute value (i.e., restricting how fast that particular attribute value can place orders in the future); model adjustment (i.e., changing input parameters or coefficients or weights in the model); drawing down an allowed number of alerts for this particular attribute value per day, week and month, etc.; placing the attribute value into an exclusion table so no more alerts are generated from this attribute value (assuming that the anomaly is deemed to be not fraudulent); passing orders with the attribute value for manual review for a period of time; and increasing the weighting of specific business or model rules in fraud decisions to account for increased risk. In some cases, even though an alert has been generated, a business rule may be used to decide whether not to take action simply based upon the dollar amount at risk.

Finally, in response to any of these actions that may be taken, a future transaction may be denied 74 or subject to further review 76 by risk decision engine 70 during real-time online production. It is also possible that a future transaction may be processed 72 by risk decision engine 70 if not for one of the actions taken such as placing an attribute value into an exclusion table, changing a model, etc.

Computer System Embodiment

Figure 10A:
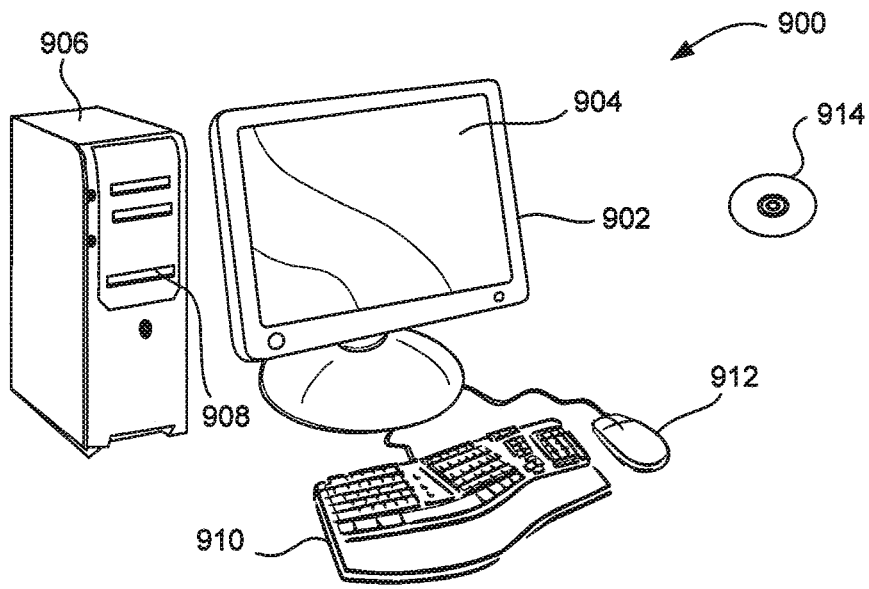
FIGS. 10A and 10B illustrate a computer system suitable for implementing embodiments of the present invention.
Figure 10B:
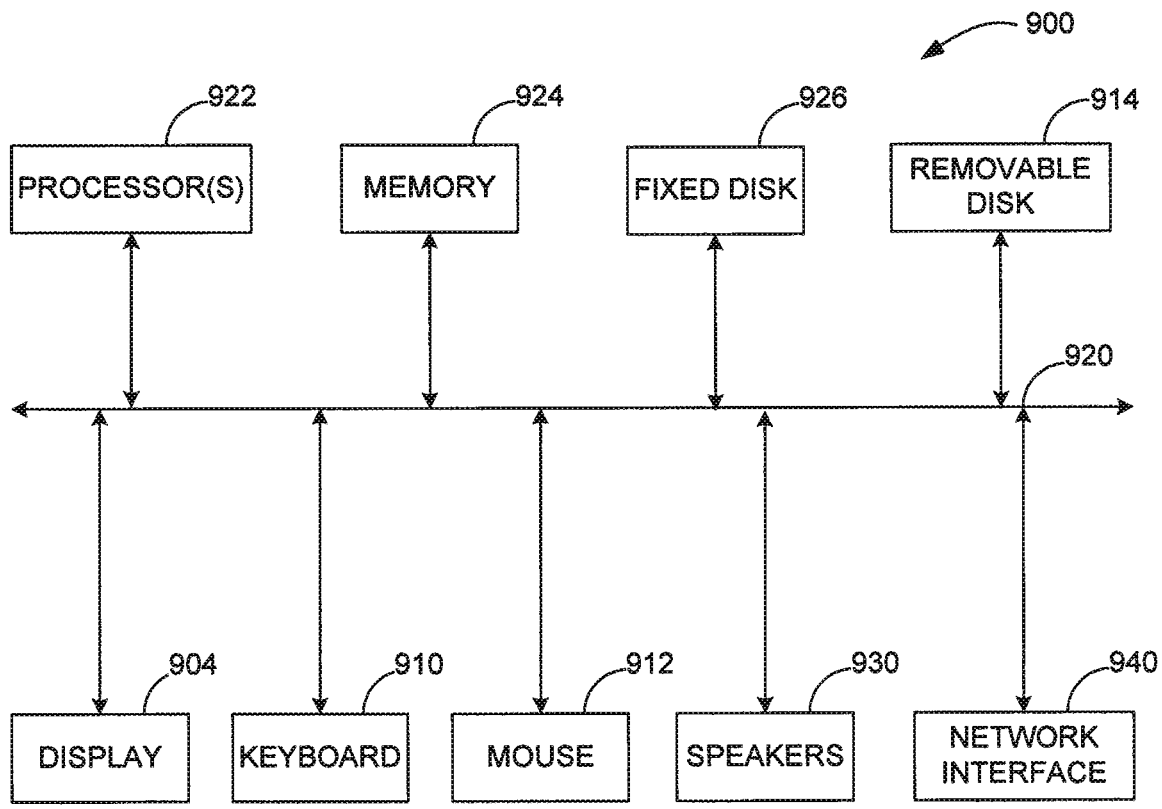

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of generating an alert in a transaction processing system that continuously receives and processes transactions, said method comprising:

receiving, at said transaction processing system, a plurality of first transactions over a plurality of networks from a plurality of computing devices, each of said first transactions being processed by said system during a measurement time window and each satisfying a criterion, wherein each of said first transactions includes attributes and associated values and is associated with a payment card, wherein said criterion includes at least one of a time range, a particular merchant or merchants, a location, a particular channel, a partner and a product;

receiving, at said transaction processing system, a plurality of second transactions over a plurality of networks from a plurality of computing devices, each of said second transactions being processed by said system during a baseline time window prior to said measurement time window, wherein each of said second transactions also satisfies said criterion and is associated with a payment card;

calculating, by said system, after said measurement time window, a current value for a risk metric based upon a subset of said first transactions that each include a particular attribute value, wherein said particular attribute value is associated with a characteristic or location of a computing device used to submit said each of said first transactions;

calculating, by said system, a baseline value for said risk metric based upon a subset of said second transactions that each include said particular attribute value associated with a characteristic or location of a computing device used to submit said each of said second transactions;

comparing said current value for said risk metric to said baseline value for said risk metric and generating an alert in said transaction processing system when said current value for said risk metric is greater than said baseline value for said risk metric; and denying a future transaction associated with a payment card, wherein said future transaction is received in said transaction processing system, and wherein said future transaction includes said particular attribute value associated with a computing device used to submit said future transaction.

2. A method as recited in claim 1 wherein said generating is performed within three minutes after the end of said measurement time window.

3. A method as recited in claim 1 further comprising:

extracting said first transactions and said second transactions from a transaction database of all transactions received within an enterprise using said first criterion.

4. A method as recited in claim 1 wherein said risk metric is an IP address to payment device distance risk metric, an IP address to new payment device distance risk metric, an MDN to payment device distance risk metric, a new payment device risk metric, a new stored value account risk metric, a chargeback rate risk metric, a fail rate risk metric, a proportion BIN country risk metric, or a velocity risk metric.

5. A method as recited in claim 1 wherein denying a future transaction further comprises:

blacklisting any future transaction that includes said attribute value, or placing a velocity adjustment on any future transaction that includes said attribute value.

6. A method as recited in claim 1 further comprising:

before generating said alert, determining that a current dollar amount of said first transactions including said attribute value is greater than a baseline dollar amount of said second transactions including said attribute value that has been normalized.

7. A method as recited in claim 6 further comprising:

before generating said alert, determining that a current order count of said first transactions including said attribute value is greater than a baseline order count and said second transactions including said attribute value that has been normalized.

8. A method as recited in claim 6 further comprising:

adjusting said normalized baseline dollar amount by a business weighting.

9. A method as recited in claim 1 further comprising:
adjusting said baseline value by a business weighting.

10. A method as recited in claim 1, further comprising:
not delivering digital goods or services associated with said future transaction from said merchant to said future computing device.

11. A method of processing a transaction in a transaction processing system that continuously receives and processes transactions, said method comprising:
receiving, at said transaction processing system, a plurality of first transactions over a plurality of networks from a plurality of computing devices, each of said first transactions being processed by said system during a measurement time window and each satisfying a criterion, wherein each of said first transactions includes attributes and associated values and is associated with a payment card, wherein said criterion includes at least one of a time range, a particular merchant or merchants, a location, a particular channel, a partner and a product;
receiving, at said transaction processing system, a plurality of second transactions over a plurality of networks from a plurality of computing devices, each of said second transactions being processed by said system during a baseline time window prior to said measurement time window, wherein each of said second transactions also satisfies said criterion and is associated with a payment card;
calculating, by said system, after said measurement time window, a current value for a risk metric based upon a subset of said first transactions that each include a particular attribute value, wherein said particular attribute value is associated with a characteristic or location of a computing device used to submit said each of said first transactions;
calculating, by said system, a baseline value for said risk metric based upon a subset of said second transactions that each include said particular attribute value associated with a characteristic or location of a computing device used to submit said each of said second transactions;
comparing said current value for said risk metric to said baseline value for said risk metric and outputting an indication that said first transactions are normal when said current value for said risk metric is less than said baseline value for said risk metric; and
authorizing a future transaction associated with a payment card, wherein said future transaction is received in said transaction processing system, and wherein said future transaction includes said particular attribute value associated with a computing device used to submit said future transaction.

12. A method as recited in claim 11, further comprising:
delivering digital goods or services associated with said future transaction from said merchant to said future computing device.

* * * * *